United States Patent
Wang et al.

(10) Patent No.: US 12,407,478 B2
(45) Date of Patent: Sep. 2, 2025

(54) METHODS, DEVICES AND COMPUTER STORAGE MEDIA OF COMMUNICATION DURING TRANSMISSION AND RECEPTION

(71) Applicant: NEC CORPORATION, Tokyo (JP)

(72) Inventors: Gang Wang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 472 days.

(21) Appl. No.: 17/795,629

(22) PCT Filed: Feb. 12, 2020

(86) PCT No.: PCT/CN2020/074952
§ 371 (c)(1),
(2) Date: Jul. 27, 2022

(87) PCT Pub. No.: WO2021/159353
PCT Pub. Date: Aug. 19, 2021

(65) Prior Publication Data
US 2023/0079128 A1 Mar. 16, 2023

(51) Int. Cl.
*H04L 5/00* (2006.01)
*H04L 1/1829* (2023.01)
(Continued)

(52) U.S. Cl.
CPC .......... *H04L 5/0055* (2013.01); *H04L 1/1854* (2013.01); *H04L 1/1896* (2013.01); *H04W 72/0446* (2013.01); *H04W 72/23* (2023.01)

(58) Field of Classification Search
None
See application file for complete search history.

(56) References Cited

U.S. PATENT DOCUMENTS

2010/0202396 A1  8/2010  Won et al.
2014/0050130 A1  2/2014  Kim et al.
(Continued)

FOREIGN PATENT DOCUMENTS

CN  102165730 A  8/2011
CN  109150436 A  1/2019
(Continued)

OTHER PUBLICATIONS

Ericsson, "Maintenance issues of DL/UL scheduling and HARQ procedure", 3GPP TSG-RAN WG1 Meeting #94bis, Tdoc R1-1811490, Chengdu, China, Oct. 8-12, 2018 (13 pages total).

(Continued)

*Primary Examiner* — Saad Khawar
(74) *Attorney, Agent, or Firm* — Sughrue Mion, PLLC

(57) ABSTRACT

Embodiments relate to methods, devices and computer readable media of communication during data transmission and reception. A method of communication comprises receiving, at a terminal device and from a network device, resource allocation information indicating a slot offset value associated with transmission of uplink data or reception of downlink data, the slot offset value being selected from a range for scheduling slots in a carrier frequency; and performing the transmission or reception based on the slot offset value. Embodiments can support large bandwidth in frequency, schedule more uplink or downlink slots, and increase channel utilization.

14 Claims, 8 Drawing Sheets

(51) Int. Cl.
  *H04L 1/1867* (2023.01)
  *H04W 72/0446* (2023.01)
  *H04W 72/23* (2023.01)

(56) References Cited

U.S. PATENT DOCUMENTS

| | | | |
|---|---|---|---|
| 2019/0268207 A1 | 8/2019 | Al-Imari et al. | |
| 2020/0044785 A1 | 2/2020 | Park et al. | |
| 2020/0358562 A1* | 11/2020 | Peng | H04W 24/08 |
| 2021/0321446 A1* | 10/2021 | Lee | H04W 72/535 |
| 2021/0336726 A1* | 10/2021 | Takeda | H04L 1/1825 |
| 2022/0167193 A1* | 5/2022 | Kim | H04W 72/044 |

FOREIGN PATENT DOCUMENTS

| | | |
|---|---|---|
| KR | 10-2014-0080298 A | 6/2014 |
| WO | 2016/113177 A1 | 7/2016 |
| WO | 2018/127628 A1 | 7/2018 |

OTHER PUBLICATIONS

Partial Supplementary European Search Report issued Dec. 20, 2022 in European Application No. 20919078.4.

JP Office Communication for JP Application No. 2022-548753, mailed on Jan. 9, 2024 with English Translation.

Intel Corporation, "UCI enhancements for eURLLC", 3GPP TSG RAN WG1 #98 R1-1908646, Aug. 30, 2019, pp. 1-pp. 14.

Huawei, HiSilicon, "HARQ enhancements in NR unlicensed", 3GPP TSG RAN WG1 #96b R1-1905648, Apr. 12, 2019, pp. 1-pp. 13.

ITRI, "HARQ enhancements for NR-U", 3GPP TSG RAN WG1 #97 R1-1907309, May 17, 2019, pp. 1-pp. 5.

JP Office Action for Japanese Patent Application No. 2022-548753, mailed on Jun. 25, 2024 with English Translation.

Ericsson, "HARQ-ACK transmission timing for DL RMC for FR1 TDD SCS=60kHz", 3GPP TSG RAN WG4 #90 R4-1901272, Mar. 1, 2019.

Intel Corporation, "On simulation results for 70GHz towards IMT-2020 submission", TSG RAN #84 RP-191447, Jun. 6, 2019.

International Search Report of PCT/CN2020/074952 dated Oct. 27, 2020 [PCT/ISA/210].

Written Opinion of PCT/CN2020/074952 dated Oct. 27, 2020 [PCT/ISA/237].

Chinese Office Action for CN Application No. 202080096458.5 mailed on Aug. 20, 2024 with English Translation.

* cited by examiner

METHODS, DEVICES AND COMPUTER STORAGE MEDIA OF COMMUNICATION DURING TRANSMISSION AND RECEPTION

CROSS REFERENCE TO RELATED APPLICATIONS

This application is a National Stage of International Application No. PCT/CN2020/074952, filed Feb. 12, 2020.

TECHNICAL FIELD

Embodiments of the present disclosure generally relate to the field of telecommunication, and in particular, to methods, devices and computer storage media of communication during data transmission and reception.

BACKGROUND

In recent study on a new radio (NR) technology beyond 52.6 GHz, it is agreed to support NR operation from 52.6 GHz to 71 GHz considering both licensed and unlicensed operation by leveraging frequency range 2 (FR2) design to the extent possible. Currently, new numerologies for operation in this frequency range from 52.6 GHz to 71 GHz have been studied. In this case, time line related aspects adapted to each of the new numerologies, e.g., bandwidth part (BWP) and beam switching times, hybrid automatic repeat request (HARQ) scheduling, user equipment (UE) processing, preparation and computation times for physical downlink shared channel (PDSCH), physical uplink shared channel (PUSCH), sounding reference signal (SRS) and channel state information (CSI) should also be studied.

SUMMARY

In general, embodiments of the present disclosure provide methods, devices and computer storage media of communication during data transmission and reception.

In a first aspect, there is provided a method of communication. The method comprises: receiving, at a terminal device and from a network device, uplink resource allocation information indicating a first slot offset value associated with transmission of uplink data, the first slot offset value being selected from a first range from a first start value to a first end value; and transmitting the uplink data based on the first slot offset value.

In a second aspect, there is provided a method of communication. The method comprises: receiving, at a terminal device and from a network device, downlink resource allocation information indicating a third slot offset value, the third slot offset value being associated with receipt of downlink data, the third slot offset value being selected from a third range from a third start value to a third end value; and receiving the downlink data based on the third slot offset value.

In a third aspect, there is provided a method of communication. The method comprises: determining, at a network device, uplink resource allocation information indicating a first slot offset value, the first slot offset value being associated with transmission of uplink data from a terminal device, the first slot offset value being selected from a first range from a first start value to a first end value; and transmitting the uplink resource allocation information to the terminal device.

In a fourth aspect, there is provided a method of communication. The method comprises: determining, at a network device, downlink resource allocation information indicating a third slot offset value, the third slot offset value being associated with receipt of downlink data by a terminal device, the third slot offset value being selected from a third range from a third start value to a third end value; and transmitting the downlink resource allocation information to the terminal device.

In a fifth aspect, there is provided a terminal device. The terminal device comprises a processor and a memory coupled to the processor. The memory stores instructions that when executed by the processor, cause the terminal device to perform the method according to any of the first and second aspects of the present disclosure.

In a sixth aspect, there is provided a network device. The network device comprises a processor and a memory coupled to the processor. The memory stores instructions that when executed by the processor, cause the network device to perform the method according to any of the third and fourth aspects of the present disclosure.

In a seventh aspect, there is provided a computer readable medium having instructions stored thereon. The instructions, when executed on at least one processor, cause the at least one processor to perform the method according to any of the first and second aspects of the present disclosure.

In an eighth aspect, there is provided a computer readable medium having instructions stored thereon. The instructions, when executed on at least one processor, cause the at least one processor to perform the method according to any of the third and fourth aspects of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
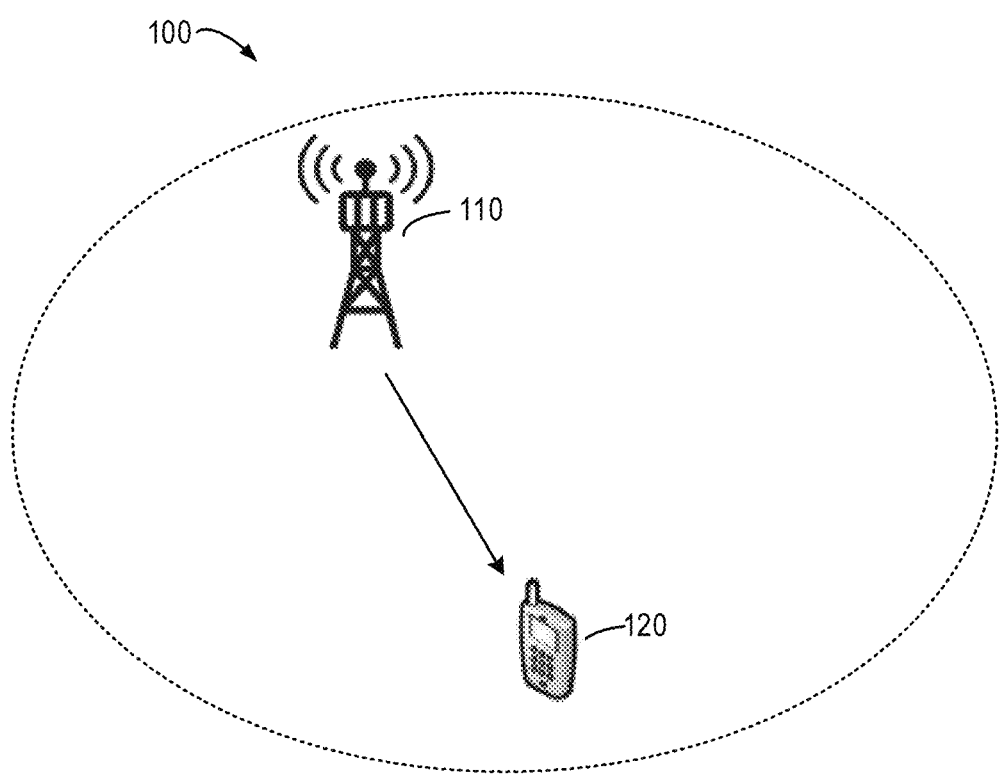
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the network device 110 may communicate with the terminal device 120 via a downlink channel such as a wireless communication downlink channel, and the terminal device 120 may communicate with the network device 110 via an uplink channel such as a wireless communication uplink channel. For example, the network device 110 may transmit resource scheduling information to the terminal device 120 via a downlink control channel such as a physical downlink control channel (PDCCH), and the terminal device 120 may perform data transmission or reception based on the resource scheduling information. In some embodiments, the network device 110 may transmit uplink resource allocation information in a PDCCH to the terminal device 120, and the terminal device 120 may transmit uplink data based on the uplink resource allocation information in a PUSCH. In some alternative embodiments, the network device 110 may transmit downlink resource allocation information in a PDCCH to the terminal device 120, and the terminal device 120 may receive downlink data in a PDSCH based on the downlink resource allocation information.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, the sixth generation (6G) communication protocols or beyond.

As mentioned above, new numerologies for operation in the frequency range from 52.6 GHz to 71 GHz have been studied, and in this case, time line related aspects adapted to each of the new numerologies should also be studied.

More specifically, in consideration with feature re-usability and design commonality with existing NR specification in requirements for NR beyond 52.6 GHz in TR 38.807, it would be good to be able to support features for FR1 and FR2 as defined in NR with minimal change (if possible) and support a common design structure that could support various use cases.

To that extent, further considerations of using an integer ratio between clock rates of NR below and NR above 52.6 GHz should be investigated. One possibility to achieve this would be to maintain the NR numerology scaling principle but extend to higher numerologies, i.e. $\Delta f = 2^\mu \times 15$ kHz with an appropriate range of possible integer values for $\mu$. For example, more subcarrier spacings (SCSs) such as 480 KHz, 960 KHz, 1920 KHz and 3840 KHz have been presented, and the corresponding number of available subcarriers, discrete Fourier transform (IDFT) point number and sampling frequencies have also been presented.

However, current sampling time still cannot be fit for the new numerologies, current ranges defined for K0, K1 and K2 are too small to schedule all slots in carrier frequencies above 52.6 GHz, and current N1 and N2 defined based on SCS also cannot be fit for the new numerologies. Herein, K0 denotes timing between a downlink resource grant on a PDCCH and a downlink data transmission on a PDSCH, K1 denotes timing between a downlink data reception on the PDSCH and a hybrid automatic repeat request acknowledgment (HARQ-ACK) transmission, and K2 denotes timing between an uplink resource grant on the PDCCH and uplink data transmission on the PUSCH. N1 denotes PDSCH decoding time at a terminal device and N2 denotes PUSCH preparing time at a terminal device.

In view of the above, embodiments of the present disclosure provide an improved solution of communication by extending a definition of a time unit and ranges of K0, K1, K2, N1 and N2. Firstly, the extension of these parameters will be described below.

Time Unit (Also Referred to as Second Information Below)

In current NR Release 15 and Release 16, a time unit $T_c$ is defined as equation (1).

$$T_c = 1/(\Delta f_{max} \cdot N_f) \qquad (1)$$

where $\Delta f_{max} = 480 \cdot 10^3$ Hz and $N_f = 4096$. The constant $\kappa = T_s/T_c = 64$ where $T_s = 1/(\Delta f_{ref} \cdot N_{f,ref})$, $\Delta f_{ref} = 15 \cdot 10^3$ Hz and $N_{f,ref} = 2048$.

According to embodiments of the present disclosure, a time unit is extended to be changed according to the used numerologies. In some embodiments, a scaling factor s (also referred to as a second scaling factor below) may be determined based on a sampling frequency and an associated mapping from a set of SCSs to a set of scaling factors, and the time unit is determined based on the second scaling factor. In the present disclosure, the sampling frequency refers to a reference subcarrier spacing such as $\Delta f_{max}$. The set of SCSs are adapted for the new numerologies. In some embodiments, the set of SCSs may comprise at least one SCS equal to or greater than a first predetermined value. In some embodiments, the first predetermined value may be selected from a group consist of 480 KHz, 960 KHz, 1920 KHz and 3840 KHz.

In some example embodiments, $\Delta f_{max}$ and K may be defined as equations (2) and (3) respectively.

$$\Delta f_{max} = 480 \cdot 10^3 (1+s) \qquad (2)$$

$$\kappa = T_s/T_c = 64(1+s) \qquad (3)$$

where s is based on the used SCS.

In some embodiments, s may be in the range [0, 0.5, 1, 1.5, 2 . . . ] or part of the range. In this case, in some embodiments where a sampling frequency is the same as the used SCS, a mapping between SCSs and s may be presented as Table 1.

TABLE 1

Mapping between SCSs and s where
a sampling frequency is the same as the used SCS

| SCS | s |
|---|---|
| 480 KHz | 0 |
| 720 KHz | 0.5 |
| 960 KHz | 1 |
| 1200 KHz | 1.5 |

In some embodiments where a sampling frequency is higher than the used SCS, a mapping between SCSs and s may be presented as Table 2.

TABLE 2

Mapping between SCSs and s where
a sampling frequency is higher than the used SCS

| SCS | s |
|---|---|
| 480 KHz | 0.5 |
| 720 KHz | 1 |
| 960 KHz | 1.5 |
| 1200 KHz | 2 |

In some alternative embodiments, s may be in the range [0, 1, 2, 3, 4 . . . ] or part of the range. In this case, in some embodiments where a sampling frequency is the same as the used SCS, a mapping between SCSs and s may be presented as Table 3.

TABLE 3

Mapping between SCSs and s where
a sampling frequency is the same as the used SCS

| SCS | s |
|---|---|
| 480 KHz | 0 |
| 960 KHz | 1 |
| 1440 KHz | 2 |
| 1920 KHz | 3 |
| 2400 KHz | 4 |

In some embodiments where a sampling frequency is higher than the used SCS, a mapping between SCSs and s may be presented as Table 4.

TABLE 4

Mapping between SCSs and s where
a sampling frequency is higher than the used SCS

| SCS | s |
|---|---|
| 480 KHz | 1 |
| 960 KHz | 2 |
| 1440 KHz | 3 |
| 1920 KHz | 4 |
| 2400 KHz | 5 |

In some alternative example embodiments, $\Delta f_{max}$ and κ may be defined as equations (4) and (5) respectively.

$$\Delta f_{max} = 480 \cdot 10^3 * 2^s \qquad (4)$$

$$\kappa = T_s/T_c = 64 * 2^s \qquad (5)$$

where s is based on the used SCS.

In some embodiments, s may be in the range [0, 1, 2, 3 . . . ] or part of the range. In this case, in some embodiments where a sampling frequency is the same as the used SCS, a mapping between SCSs and s may be presented as Table 5.

TABLE 5

Mapping between SCSs and s where
a sampling frequency is the same as the used SCS

| SCS | s |
|---|---|
| 480 KHz | 0 |
| 960 KHz | 1 |
| 1920 KHz | 2 |
| 3840 KHz | 3 |

In some alternative example embodiments, $\Delta f_{max}$ and K may be defined as equations (6) and (7) respectively.

$$\Delta f_{max} = 480 \cdot 10^3 * 2^{(s+1)} \qquad (6)$$

$$\kappa = T_s/T_c = 64 * 2^{(s+1)} \qquad (7)$$

where s is based on the used SCS. In some embodiments, s may be in the range [0, 1, 2, 3 . . . ] or part of the range. In this case, in some embodiments where a sampling frequency is 2 times of the used SCS, a mapping between SCSs and s may be presented as Table 6.

TABLE 6

Mapping between SCSs and s where
a sampling frequency is 2 times of the used SCS

| SCS | s |
|---|---|
| 480 KHz | 0 |
| 960 KHz | 1 |
| 1920 KHz | 2 |
| 3840 KHz | 3 |

So far, a time unit changed according to the used numerologies is described above. It should be note that, the above listed examples are merely for illustration, any other suitable ways similar to the above are also feasible.

Alternatively, a time unit may be extended to be a fixed value adapted for the new numerologies. In some embodiments, a time unit may be predefined for at least one subcarrier spacing equal to or greater than a first predetermined value. In some embodiments, the first predetermined value may be selected from a group consist of 480 KHz, 960 KHz, 1920 KHz and 3840 KHz.

For example, in some embodiments, a time unit $T_{C\_new}$ may be defined as equations (8) and (9) respectively.

$$T_{C\_new} = 1/(\Delta f_{max\_new} \cdot N_f) \qquad (8)$$

$$K_{new} = T_s/T_{C\_new} \qquad (9)$$

In some embodiments, $\Delta f_{max\_new} = 960 \cdot 10^3$, and $K_{new} = 128$. In some alternative embodiments, $\Delta f_{max\_new} = 1920 \cdot 10^3$, and $K_{new} = 256$. In some alternative embodiments, $\Delta f_{max\_new} = 3840 \cdot 10^3$, and $K_{new} = 512$. It should be note that, the above listed values are merely for illustration, any other suitable values are also feasible.

The extended time unit according to embodiments of the present disclosure can support new numerologies while keeping the original form of the equation, and cause NR to support large bandwidth in frequency above 52.6 GHz with the large subcarrier spacing.

K2 (Also Referred to as First Slot Offset Value Below)

According to current specification in TS 38.214, The slot Ks where a terminal device shall transmit the PUSCH is determined by K2 as $$Ks = \left[ n \cdot \frac{2^{\mu_{PUSCH}}}{2^{\mu_{PDCCH}}} \right] + K_2 + \left[ \left( \frac{N_{slot,offset,PDCCH}^{CA}}{2^{\mu_{offset,PDCCH}}} - \frac{N_{slot,offset,PUSCH}^{CA}}{2^{\mu_{offset,PUSCH}}} \right) \cdot 2^{\mu_{PUSCH}} \right] \qquad (10)$$

where n is the slot with the scheduling DCI, K2 is based on the numerology of PUSCH, and $\mu_{PUSCH}$ and $\mu_{PDCCH}$ are the subcarrier spacing configurations for PUSCH and PDCCH, respectively.

Figure 2:
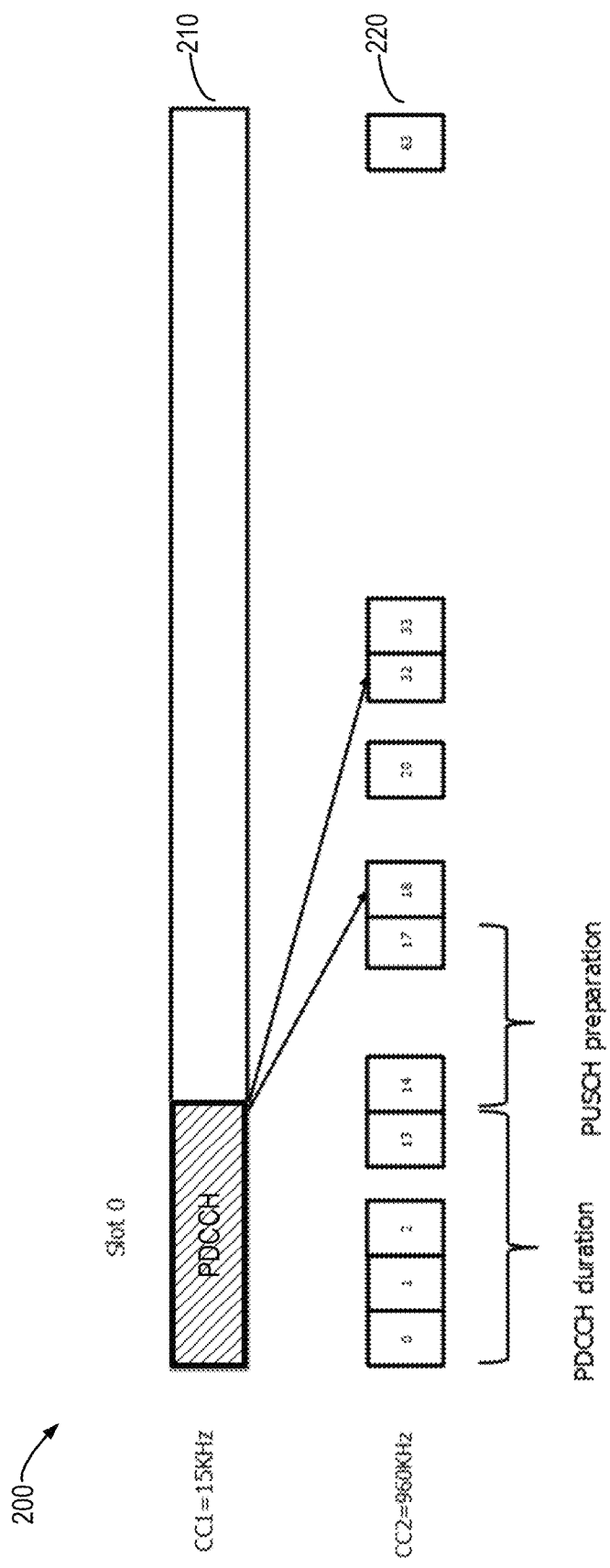
FIG. 2 illustrates a schematic diagram illustrating uplink resource scheduling according to some embodiments of the present disclosure.

For example, in case of carrier aggregation (CA) that scheduling component carrier 1 (CC1) is 15 KHz and scheduled component carrier 2 (CC2) is 960 KHz, as shown in FIG. 2 which illustrates a schematic diagram 200 illustrating uplink resource scheduling according to some embodiments of the present disclosure, if CC1 210 and CC2 220 frame is aligned, CC1 210 cross carrier schedules CC2 220. PDCCH duration is 3 symbols in CC1 and is 192 symbols (nearly 14 slots) in CC2. PUSCH processing time $T_{proc,2}$ is as below.

$$T_{proc,2} = \max((N_2 + d_{2,1})(2048 + 144) \cdot \kappa 2^{-\mu} \cdot T_C, d_{2,2}) \qquad (11)$$

where $T_{proc,2}$ denotes PUSCH processing time, $d_{2,1}$ and $d_{2,2}$ denotes timing offset shown in TS 38.214.

If N2 for 960 KHz is 48 symbols and is 4 slots, the slot Ks is determined by K2 as shown in equation (10), and K2 is chosen from (0 . . . 32), PDCCH may only schedule slots from 18 to 32 in CC2 220, and cannot schedule other slots from 33 to 63.

According to embodiments of the present disclosure, K2 is selected from a range (also referred to as a first range) for scheduling all slots in a carrier frequency, such as in a component carrier (CC) in case of CA. For example, all slots from 0 to 63 in CC2 220 can be scheduled.

In some embodiments, the first range may be from a first start value being zero to a first end value being equal to or greater than 64. For example, in some embodiments, K2 may be extended to (0 . . . 64). In some alternative embodiments, K2 may be extended to (0 . . . 128). In some alternative embodiments, K2 may be extended to (0 . . . 256). In some alternative embodiments, K2 may be extended to (0 . . . 1024).

For example, K2 may be configured via an RRC signaling as below.

```
PUSCH-TimeDomainResourceAllocation ::= SEQUENCE {
    K2 INTEGER (0..64) (or (0..128), or (0..256)) OPTIONAL, -- Need S
    ...
}
or
PUSCH-TimeDomainResourceAllocationForDCI-Format0-x-r17 ::= SEQUENCE {
    K2 INTEGER (0..64) (or (0.. 128), or (0..256)) OPTIONAL, -- Need S
    ...
} where x=0 or 1 or 2.
```

In some alternative embodiments, a basic slot offset value k2 (also referred to as a second slot offset value below) and a scaling factor m (also referred to as a first scaling factor) may be determined, and K2 may be determined based on a product of the basic slot offset value and the scaling factor m. In some embodiments, the scaling factor m is one selected from a group of predetermined scaling factors. For example, k2=INTEGER(0 . . . 32), and K2 may be defined as below.

$$K2=k2*m=\text{INTEGER}(0 \ldots 32*m), m=1, 2, 3, 4 \quad (12)$$

where m depends on the numerology to be used. It should be noted that the values of m are not limited to the listed example, and any other suitable values are also feasible.

For example, K2 may be configured via an RRC signaling as below.

```
PUSCH-TimeDomainResourceAllocationForDCI-Format0-x-r17 ::= SEQUENCE {
    k2 INTEGER (0..32) OPTIONAL, -- Need S
    m INTEGER (1..4) OPTIONAL, -- Need S
    ...
} where x=0 or 1 or 2.
```

In some alternative embodiments, a set of K2 values (also referred to as a first set of slot offset values below) may be predefined, for example, a set of K2 values {(0 . . . 64), (0 . . . 128), (0 . . . 256)} may be predefined, and an index indicating K2 in the set of K2 values may be configured via an RRC signaling.

With extension for K2 according to embodiments of the present disclosure, more uplink slots can be scheduled and channel utilization can be increased.

K0 (Also Referred to as Third Slot Offset Value Below)

According to current specification in TS 38.214, The slot Ks' allocated for a PDSCH is determined by K0 as $$Ks' = \left\lfloor n \cdot \frac{2^{\mu_{PDSCH}}}{2^{\mu_{PDCCH}}} \right\rfloor + K0 + \left[ \left( \frac{N^{CA}_{slot,offset,PDCCH}}{2^{\mu_{offset,PDCCH}}} - \frac{N^{CA}_{slot,offset,PDSCH}}{2^{\mu_{offset,PDSCH}}} \right) \cdot 2^{\mu_{PDSCH}} \right] \quad (13)$$

where n is the slot with the scheduling DCI, K0 is based on the numerology of PDSCH, and $\mu_{PDSCH}$ and $\eta_{PDCCH}$ are the subcarrier spacing configurations for PDSCH and PDCCH, respectively.

Figure 3:
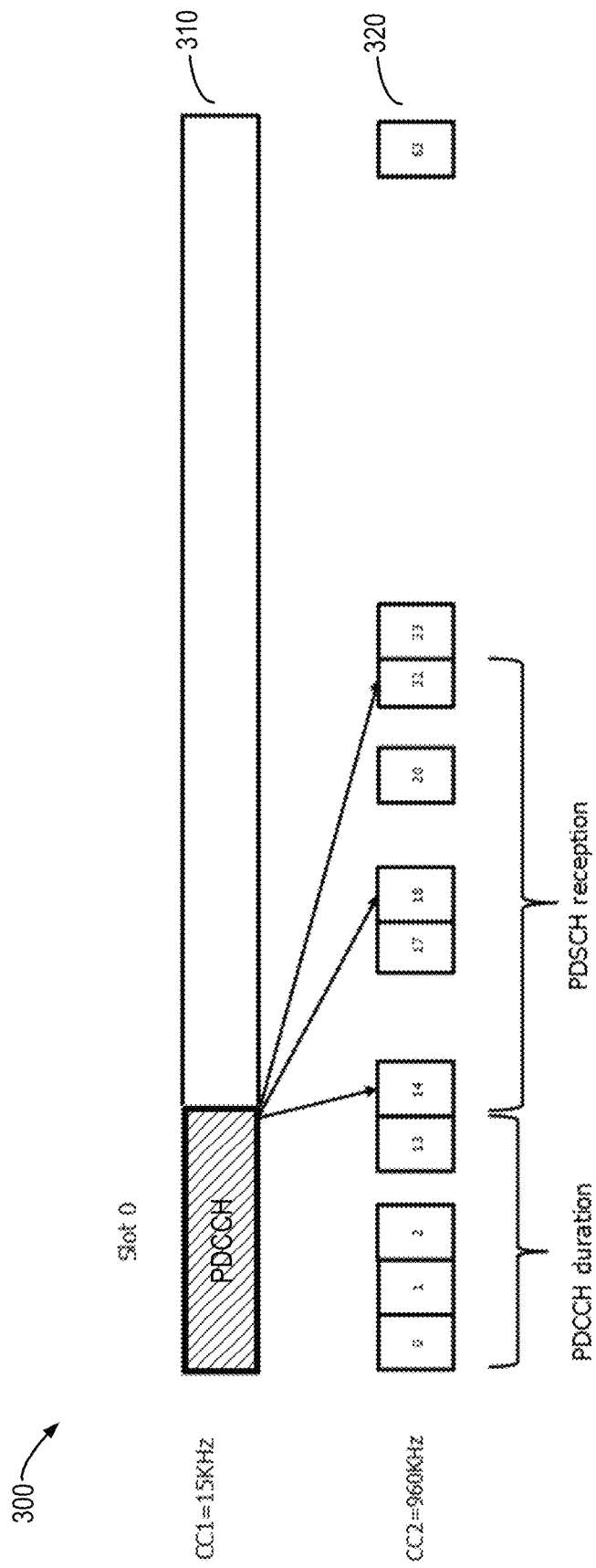
FIG. 3 illustrates a schematic diagram illustrating downlink resource scheduling according to some embodiments of the present disclosure.

For example, in case of carrier aggregation (CA) that scheduling CC (CC1) is 15 KHz and scheduled CC (CC2) is 960 KHz, as shown in FIG. 3 which illustrates a schematic diagram 300 illustrating downlink resource scheduling according to some embodiments of the present disclosure, if CC1 310 and CC2 320 frame is aligned, CC1 310 cross carrier schedules CC2 320. PDCCH duration is 3 symbols in CC1 and is 192 symbols (14 slots) in CC2. K0 can be RRC configured or using default TDRA table. If K0 is chosen from (0 . . . 32), PDCCH may only schedule slots from 14 to 32 in CC2 320, and cannot schedule other slots from 33 to 63.

According to embodiments of the present disclosure, K0 is selected from a range (also referred to as a third range) for scheduling all slots in a carrier frequency, such as in a CC in case of CA. For example, all slots from 0 to 63 in CC2 320 can be scheduled. In some embodiments, the third range may be from a third start value being zero to a third end value being equal to or greater than 64. For example, in some embodiments, K0 may be extended to (0 . . . 64). In some alternative embodiments, K0 may be extended to (0 . . . 128). In some alternative embodiments, K0 may be extended to (0 . . . 256).

For example, K0 may be configured via an RRC signaling as below.

```
PDSCH-TimeDomainResourceAllocation ::= SEQUENCE {
    K0 INTEGER (0..64) (or (0..128), or (0..256)) OPTIONAL, -- Need S
    ...
}
or
PDSCH-TimeDomainResourceAllocationForDCI-Format1-x-r17 ::= SEQUENCE {
    K0 INTEGER (0..64) (or (0..128), or (0..256)) OPTIONAL, -- Need S
    ...
} where x=0 or 1 or 2.
```

In some alternative embodiments, a basic slot offset value k0 (also referred to as a fourth slot offset value below) and a scaling factor m' (also referred to as a third scaling factor) may be determined, and K0 may be determined based on a product of the basic slot offset value and the scaling factor m'. In some embodiments, the scaling factor m' is one selected from a group of predetermined scaling factors. For example, k0=INTEGER(0 . . . 32), and K0 may be defined as below.

$$K0=k0*m'=\text{INTEGER}(0 \ldots 32*m'), m'=1, 2, 3, 4 \quad (14)$$

where m' depends on the numerology to be used. It should be noted that the values of m' are not limited to the listed example, and any other suitable values are also feasible.

For example, K0 may be configured via an RRC signaling as below.

```
PDSCH-TimeDomainResourceAllocationForDCI-Format0-x-r17 ::= SEQUENCE {
    k0 INTEGER (0..32) OPTIONAL, -- Need S
    m' INTEGER (1..4) OPTIONAL, -- Need S
    ...
} where x=0 or 1 or 2.
```

In some alternative embodiments, a set of K0 values (also referred to as a second set of slot offset values below) may be predefined, for example, a set of K0 values {(0 . . . 64), (0 . . . 128), (0 . . . 256)} may be predefined, and an index indicating K0 in the set of K0 values may be configured via an RRC signaling.

With extension for K0 according to embodiments of the present disclosure, more downlink slots can be scheduled and channel utilization can be increased.

K1 (Also Referred to as Fifth Slot Offset Value Below)

In current specification in TS 38.213, for DCI format other than format 1_0, the HARQ-ACK is transmitted according to dl-DataToUL-ACK, or dl-DataToUL-ACK-ForDCIFormat1_2 (K1), but the range of these two values is (0 . . . 15) which limits the scheduling time. K1 is specified in TS 38.331 as below.

dl-DataToUL-ACK SEQUENCE (SIZE (1 . . . 8)) OF INTEGER (0 . . . 15) OPTIONAL, —Need M.

According to embodiments of the present disclosure, K1 is selected from a range (also referred to as a fifth range) for scheduling all slots in a carrier frequency, such as in a CC. In some embodiments, the fifth range may be from a fifth start value being zero to a fifth end value being equal to or greater than 31. For example, the range of K1 may be extended to (1 . . . P), P may be any of 31, 63, 127, 255, 511 or 1023. In some embodiments, P depends on capability of the terminal device. In some embodiments, P depends on the used numerology. K1 may be specified as below.

dl-DataToUL-ACK SEQUENCE (SIZE (1 . . . 8)) OF INTEGER (0 . . . P) OPTIONAL, —Need M.

In some alternative embodiments, a set of K1 values may be defined and each of K1 values has a different range. In some embodiments, capability of the terminal device is used to choose one from the set of K1 values. In some embodiments, the used numerology is used to choose one from the set of K1 values. In these cases, the set of K1 values may be specified as below.

dl-DataToUL-ACK SEQUENCE (SIZE (1 . . . 8)) OF INTEGER (0 . . . 15) OPTIONAL,—Need M
dl-DataToUL-ACK1 SEQUENCE (SIZE (1 . . . 8)) OF INTEGER (16 . . . 31) OPTIONAL,—Need M
dl-DataToUL-ACK2 SEQUENCE (SIZE (1 . . . 8)) OF INTEGER (32 . . . 47) OPTIONAL,—Need M.

With the extension of K1 according to embodiments of the present disclosure, the proper timing for HARQ-ACK feedback can be configured.

N1 (Also Referred to as Third Information Below)

In current specifications, PDSCH decoding time N1 at a terminal device is changed according to Tables 7 and 8 as below.

TABLE 7

PDSCH decoding time for PDSCH processing capability 1

PDSCH decoding time N1 [symbols]

| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 8

PDSCH decoding time for PDSCH processing capability 2

| $\mu$ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

It can be seen that N1 is decided by PDSCH processing capability and the SCS. When the new numerology is introduced, the values of N1 shall be redefined.

According to embodiments of the present disclosure, the values of N1 may be defined as in Tables 9 and 10.

TABLE 9

PDSCH decoding time for PDSCH processing capability 1 when $\mu > 3$

PDSCH decoding time N1 [symbols]

| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 4 (240 KHz) | 22 | 25 |
| 5 (480 KHz) | 25 | 28 |
| 6 (960 KHz) | 28 | 30 |
| 7 (1920 KHz) | 30 | 32 |
| 8 (3840 KHz) | 32 | 35 |

TABLE 10

PDSCH decoding time for PDSCH processing capability 2 when $\mu > 2$

| $\mu$ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 3 (120 KHz) | 12 |
| 4 (240 KHz) | 16 |
| 5 (480 KHz) | 18 |
| 6 (960 KHz) | 20 |
| 7 (1920 KHz) | 22 |
| 8 (3840 KHz) | 24 |

It should be noted that the above listed values are merely for illustration, and any other suitable values are also feasible.

In some alternative embodiments, N1 may be configured via an RRC signaling. For example, N1 may be configured together with BWP as below.

```
BWP ::=                         SEQUENCE {
    locationAndBandwidth        INTEGER (0..37949),
    subcarrierSpacing           SubcarrierSpacing,
    cyclicPrefix                ENUMERATED { extended }
    processingTime, INTEGER (0..64) OPTIONAL -- Need R
}
```

In this embodiment, the range of N1 is (0 . . . 64). It should be noted that other suitable ranges are also feasible, for example, (0 . . . 128) or other integers.

N2 (Also Referred to as First Information Below)

In current specifications, PUSCH preparing time N2 at a terminal device is changed according to Tables 11 and 12 as below.

TABLE 11

PUSCH preparation time for PUSCH timing capability 1

| μ | PUSCH preparation time N2 [symbols] |
|---|---|
| 0 | 10 |
| 1 | 12 |
| 2 | 23 |
| 3 | 36 |

TABLE 12

PUSCH preparation time for PUSCH timing capability 2

| μ | PUSCH preparation time N2 [symbols] |
|---|---|
| 0 | 5 |
| 1 | 5.5 |
| 2 | 11 for frequency range 1 |

It can be seen that N2 is decided by PUSCH processing capability and the SCS. When the new numerology is introduced, the values of N2 shall be redefined.

According to embodiments of the present disclosure, the values of N2 may be defined as in Tables 13 and 14.

TABLE 13

PUSCH preparation time for PUSCH timing capability 1 when μ > 3

| μ | PUSCH preparation time N2 [symbols] |
|---|---|
| 4 (240 KHz) | 40 |
| 5 (480 KHz) | 44 |
| 6 (960 KHz) | 48 |
| 7 (1920 KHz) | 52 |
| 8 (3840 KHz) | 50 |

TABLE 14

PUSCH preparation time for PUSCH timing capability 2 when μ > 2

| μ | PUSCH preparation time N2 [symbols] |
|---|---|
| 3 (120 KHz) | 14 |
| 4 (240 KHz) | 18 |
| 5 (480 KHz) | 22 |

TABLE 14-continued

PUSCH preparation time for PUSCH timing capability 2 when μ > 2

| μ | PUSCH preparation time N2 [symbols] |
|---|---|
| 6 (960 KHz) | 26 |
| 7 (1920 KHz) | 30 |
| 8 (3840 KHz) | 32 |

It should be noted that the above listed values are merely for illustration, and any other suitable values are also feasible.

In some alternative embodiments, N2 may be configured via an RRC signaling. For example, N2 may be configured together with BWP as below.

```
BWP ::=                         SEQUENCE {
    locationAndBandwidth        INTEGER (0..37949),
    subcarrierSpacing           SubcarrierSpacing,
    cyclicPrefix                ENUMERATED { extended }
    processingTime, INTEGER (0..64) OPTIONAL -- Need R
}
```

In this embodiment, the range of N2 is (0 . . . 64). It should be noted that other suitable ranges are also feasible, for example, (0 . . . 128) or other integers.

With flexible configuration of N1 and N2 by an RRC signaling according to embodiments of the present disclosure, the terminal device can adjust its processing time based on network configuration. It should be noted that, although the above description is made with respect to cross carrier scheduling, the present solution also can be applied in self-carrier scheduling.

Figure 4:
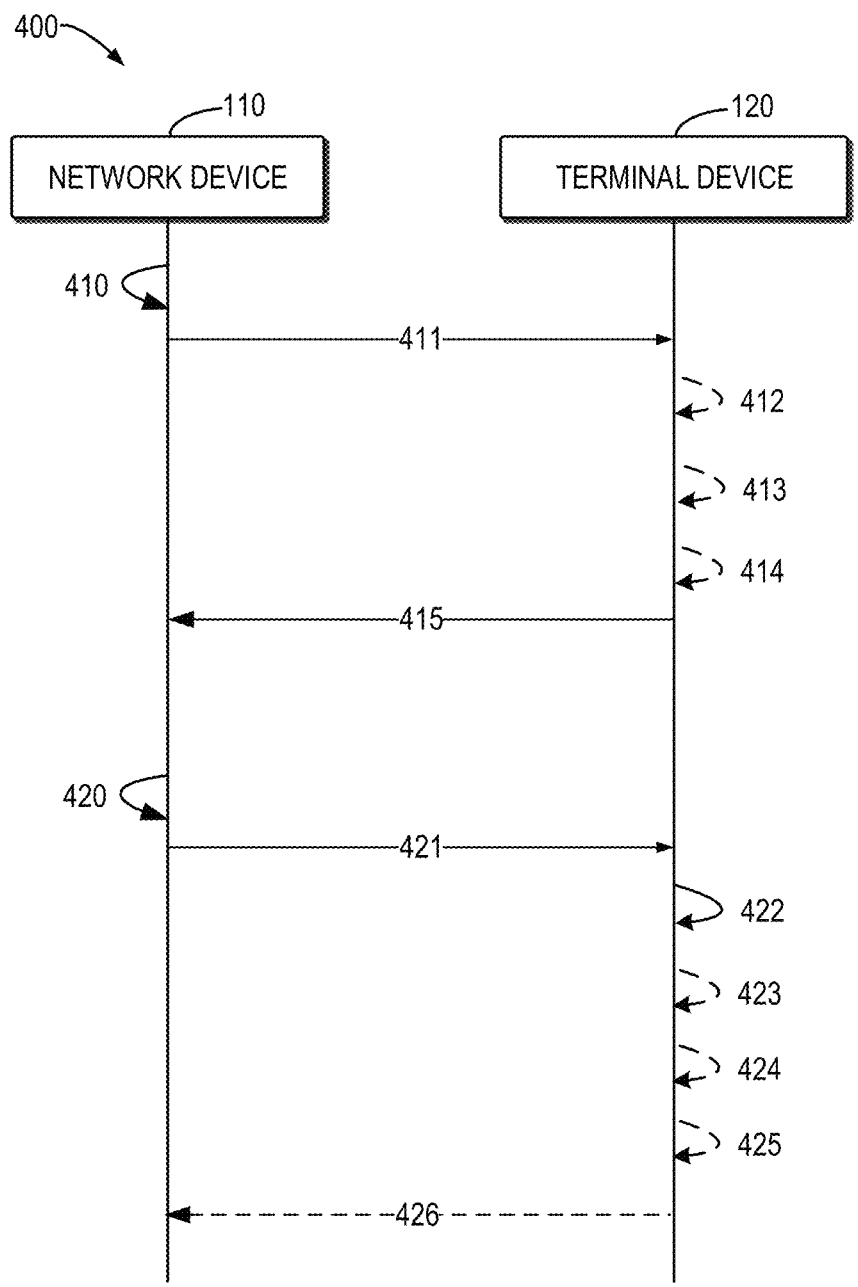
FIG. 4 illustrates a schematic diagram illustrating a process for data transmission and reception according to embodiments of the present disclosure.

So far, the extension of these parameters is described above. The corresponding operations involving these parameters will be described below. FIG. 4 illustrates a schematic diagram illustrating a process 400 for data transmission and reception according to embodiments of the present disclosure. For the purpose of discussion, the process 400 will be described with reference to FIG. 1. The process 400 may involve the network device 110 and the terminal device 120 as illustrated in FIG. 1. The process 400 is divided into two separate parts, i.e., an uplink scheduling procedure 410-415 and a downlink scheduling procedure 420-426.

Uplink Scheduling Procedure

As shown in FIG. 4, the network device 110 determines 410 uplink resource allocation information indicating K2 as defined according to the present disclosure. Upon determining K2, the network device 110 transmits 411 the uplink resource allocation information to the terminal device 120. For example, the network device 110 may transmit the uplink resource allocation information in DCI via a downlink channel such as PDCCH.

In some embodiments, upon receiving the uplink resource allocation information, the terminal device 120 may determine 412 a preparing time N2 for a channel for transmitting uplink data such as a PUSCH, the N2 being defined according to the present disclosure. The terminal device 120 may also determine 413 a corresponding time unit based on the SCS of the channel, the time unit being defined according to the present disclosure. Based on the determined N2 and the time unit, the terminal device 120 may determine 414 whether the uplink data is ready to be transmitted. The determination 414 may be performed, for example, according to the above equation (11). Other details about the determination 414 are similar with that in Section 6.4 TS 38.214, and thus are not repeated here.

Upon determining that the uplink data is ready to be transmitted, the terminal device 120 transmits 415 the uplink data. In some embodiments, the terminal device 120 may determine a slot such as Ks allocated for the uplink data based on K2, for example, according to the above equation (10), and transmit 415 the uplink data in the determined slot via an uplink channel such as a PUSCH.

Downlink Scheduling Procedure

As shown in FIG. 4, the network device 110 determines 420 downlink resource allocation information indicating K0 as defined according to the present disclosure. Upon determining K0, the network device 110 transmits 421 the downlink resource allocation information to the terminal device 120. For example, the network device 110 may transmit the downlink resource allocation information in DCI via a downlink channel such as PDCCH.

Upon receiving the downlink resource allocation information, the terminal device 120 receives 422 downlink data based on the downlink resource allocation information. For example, the terminal device 120 may determine a slot such as Ks' allocated for the downlink data based on K0, for example, according to the above equation (13), and receive the downlink data in the determined slot.

In some embodiments where the downlink resource allocation information further indicates K1, the terminal device 120 may determine 423 a decoding time N1 for a channel for receiving the downlink data such as a PDCCH, the N1 being defined above according to the present disclosure. The terminal device 120 may also determine 424 a corresponding time unit based on the SCS of the channel, the time unit being defined above according to the present disclosure. Based on the determined N1 and the time unit, the terminal device 120 may determine 425 whether the downlink data has enough processing time to be received. The determination 425 may be performed, for example, according to the following equation (15).

$$T_{proc,1}=(N1+d_{1,1})(2048+144)\cdot\kappa2^{-\mu}\cdot T_c \quad (15)$$

where $T_{proc,1}$ denotes PDSCH processing time, $d_{1,1}$ denotes timing offset shown in TS 38.214. Other details about the determination 425 are similar with that in Section 5.3 TS 38.214, and thus are not repeated here.

Upon determining that the downlink data has enough processing time to be received, the terminal device 120 may transmit 426 a HARQ-ACK for the reception of the downlink data. In some embodiments, the terminal device 120 may determine a slot allocated for transmission of the HARQ-ACK based on K1, and transmit the HARQ-ACK in the determined slot via an uplink channel such as a PUCCH or a PUSCH.

Corresponding to the extension of parameters and the related process 200 described above, embodiments of the present disclosure provide methods of communication implemented at a terminal device and at a network device. These methods will be described below with reference to FIGS. 5-10.

Figure 5:
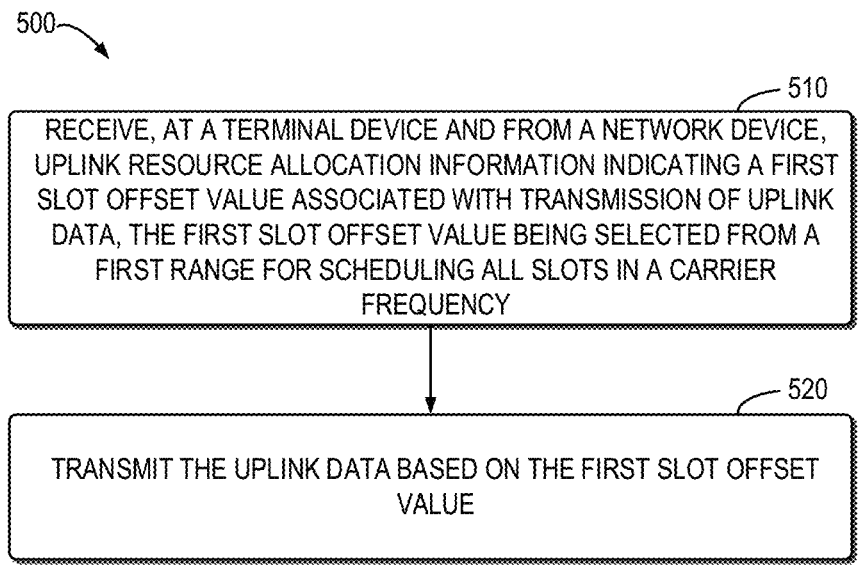
FIG. 5 illustrates an example method of communication implemented at a terminal device during uplink data transmission in accordance with some embodiments of the present disclosure.

FIG. 5 illustrates an example method 500 of communication implemented at a terminal device during uplink data transmission in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

At block 510, the terminal device 120 may receive uplink resource allocation information from the network device 110. The uplink resource allocation information indicates a first slot offset value (K2) associated with transmission of uplink data. The first slot offset value is selected from a first range from a first start value to a first end value, so as to schedule all slots in a carrier frequency such as in a CC. In some embodiments, the first range is from the first start value being zero to the first end value being equal to or greater than 64.

In some alternative embodiments, the terminal device 120 may receive a second slot offset value and a first scaling factor in the uplink resource allocation information. The second slot offset value may be selected from a second range from a second start value to a second end value, the second start value being larger than or equal to the first start value, the second end value being less than the first end value. In some embodiments, the second range may be from the second start value being zero to the second end value being equal to or greater than 32. The first scaling factor may be one selected from a group of predetermined scaling factors. In some embodiments, the group of predetermined scaling factors may consist of 1, 2, 3 and 4. Upon receiving the second slot offset value and the first scaling factor, the terminal device 120 may determine the first slot offset value based on a product of the second slot offset value and the first scaling factor.

In some alternative embodiments, the terminal device 120 may receive a first index in the uplink resource allocation information. The first index indicates the first slot offset value in a first set of slot offset values, the first set of slot offset values being received via an RRC signaling from the network device 110. Upon receiving the first index, the terminal device 120 may determine the first slot offset value from the first set of slot offset values.

At block 520, the terminal device 120 transmits the uplink data to the network device 110 based on the first slot offset value. In some embodiments, the terminal device 120 may determine a slot for transmission of the uplink data based on the first slot offset value with respect to the slot for receiving the uplink resource allocation information, and transmit the uplink data in the determined slot.

In some additional or alternative embodiments, the terminal device 120 may transmit the uplink data only when the uplink data is ready to be transmitted. It will be described in details with reference to FIG. 6 which illustrates another example method 600 of communication implemented at a terminal device during uplink data transmission in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

At block 610, the terminal device 120 may determine first information about a preparing time (N2) for a channel for transmitting the uplink data, the preparing time being associated with a subcarrier spacing of the channel. In some embodiments, the terminal device 120 may receive the first information via an RRC signaling from the network device 110.

In some alternative embodiments, the terminal device 120 may determine the first information based on a mapping from a set of subcarrier spacings to a set of preparing time, the set of subcarrier spacings comprising at least one subcarrier spacing equal to or greater than a first predetermined value. In some embodiments, the first predetermined value may be selected from a group consist of 480 KHz, 960 KHz, 1920 KHz and 3840 KHz. For example, the terminal device 120 may determine the first information based on Tables 13 and 14 described above.

At block 620, the terminal device 120 may determine second information about a time unit, the time unit being associated with the subcarrier spacing. In some embodiments, the time unit may be predefined for at least one subcarrier spacing equal to or greater than a first predetermined value. In some embodiments, the first predetermined value may be selected from a group consist of 480 KHz, 960 KHz, 1920 KHz and 3840 KHz.

In some alternative embodiments, the terminal device 120 may determine a second scaling factor based on a sampling frequency and an associated mapping from a set of subcarrier spacings to a set of scaling factors, the set of subcarrier spacings comprising at least one subcarrier spacing equal to or greater than a first predetermined value. In some embodiments, the first predetermined value may be selected from a group consist of 480 KHz, 960 KHz, 1920 KHz and 3840 KHz. Upon determining the second scaling factor, the terminal device 120 may determine the second information based on the second scaling factor.

At block 630, the terminal device 120 may determine, based on the first and second information, whether the uplink data is ready to be transmitted. Its processing is similar with that described with reference to 414 in FIG. 4 and is not repeated here. At block 640, the terminal device 120 may transmit the uplink data in accordance with a determination that the uplink data is ready to be transmitted.

Figure 6:
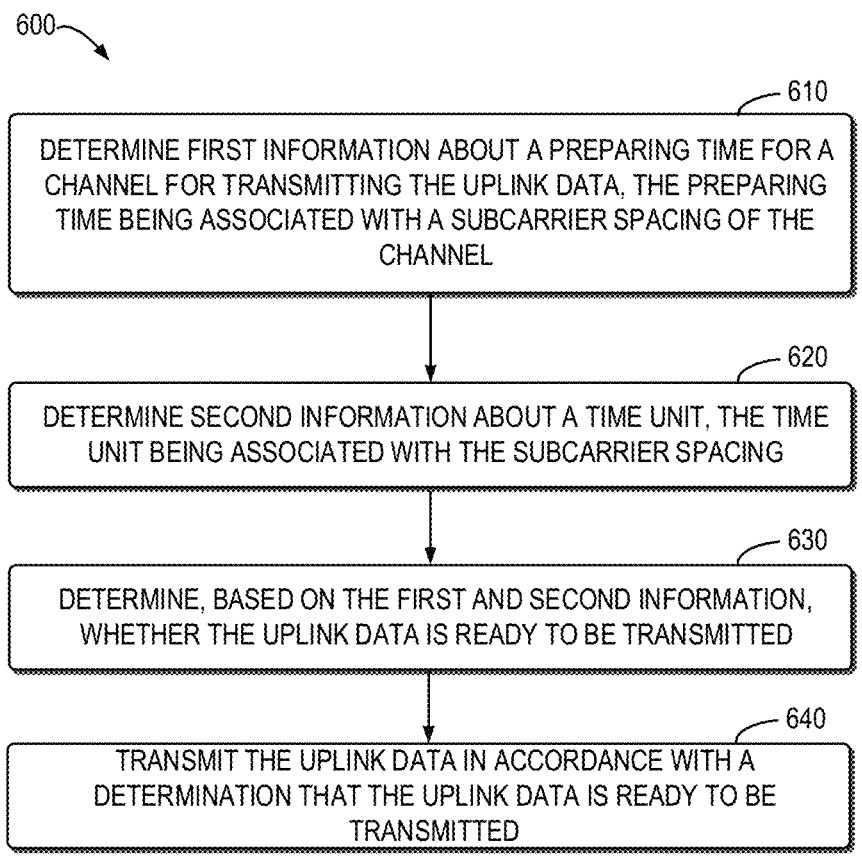
FIG. 6 illustrates another example method of communication implemented at a terminal device during uplink data transmission in accordance with some embodiments of the present disclosure.

So far, uplink data transmission at the terminal device 120 is described with reference to FIGS. 5 and 6. In this way, more uplink slots can be scheduled and channel utilization can be increased.

Figure 7:
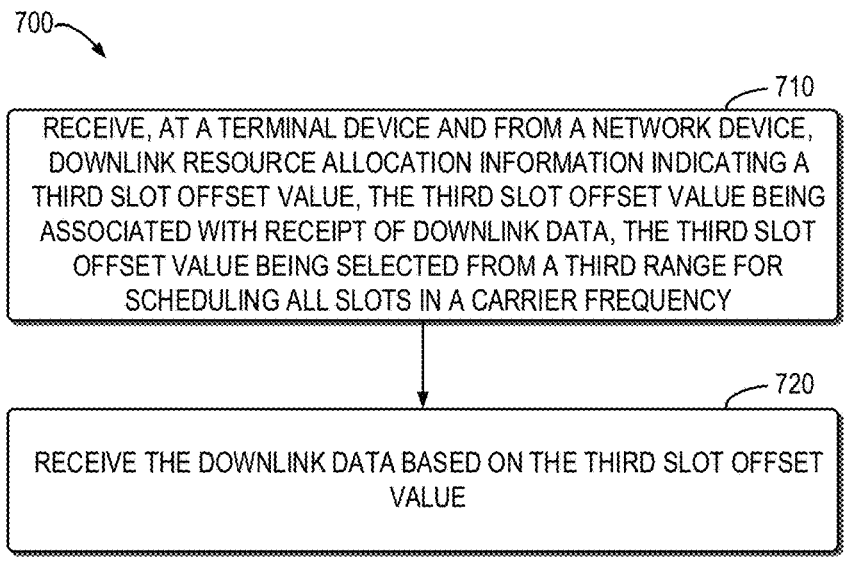
FIG. 7 illustrates an example method of communication implemented at a terminal device during downlink data reception in accordance with some embodiments of the present disclosure.

FIG. 7 illustrates an example method 700 of communication implemented at a terminal device during downlink data reception in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

At block 710, the terminal device 120 may receive downlink resource allocation information from the network device 110. The downlink resource allocation information indicates a third slot offset value (K0) associated with reception of downlink data. The third slot offset value is selected from a third range from a third start value to a third end value, so as to schedule all slots in a carrier frequency such as in a CC. In some embodiments, the third range is from the third start value being zero to the third end value being equal to or greater than 64.

In some alternative embodiments, the terminal device 120 may receive a fourth slot offset value and a third scaling factor in the downlink resource allocation information. The fourth slot offset value may be selected from a fourth range from a fourth start value to a fourth end value, the fourth start value being larger than or equal to the third start value, the fourth end value being less than the third end value. In some embodiments, the fourth range may be from the fourth start value being zero to the fourth end value being equal to or greater than 32. The third scaling factor may be one selected from a group of predetermined scaling factors. In some embodiments, the group of predetermined scaling factors may consist of 1, 2, 3 and 4. Upon receiving the fourth slot offset value and the third scaling factor, the terminal device 120 may determine the third slot offset value based on a product of the fourth slot offset value and the third scaling factor.

In some alternative embodiments, the terminal device 120 may receive a second index in the downlink resource allocation information. The second index indicates the third slot offset value in a second set of slot offset values, the second set of slot offset values being received via an RRC signaling from the network device 110. Upon receiving the second index, the terminal device 120 may determine the third slot offset value from the second set of slot offset values.

At block 720, the terminal device 120 receives the downlink data from the network device 110 based on the third slot offset value. In some embodiments, the terminal device 120 may determine a slot for reception of the downlink data based on the third slot offset value with respect to the slot for receiving the uplink resource allocation information, and receive the downlink data in the determined slot.

In some embodiments where the downlink resource allocation information further indicates a fifth slot offset value (K1) associated with transmission of an acknowledgment (HARQ-ACK) for the receipt of the downlink data, the terminal device 120 may transmit the acknowledgment based on the fifth slot offset value. In some embodiments, the fifth slot offset value is selected from a fifth range from a fifth start value to a fifth end value, so as to schedule all slots in a carrier frequency such as in a CC. In some embodiments, the fifth range may be from the fifth start value being zero to the fifth end value being equal to or greater than 31.

In some additional or alternative embodiments, the terminal device 120 may transmit the acknowledgment only when the downlink data has enough processing time to be received. It will be described in details with reference to FIG. 8 which illustrates another example method 800 of communication implemented at a terminal device during downlink data reception in accordance with some embodiments of the present disclosure. For example, the method 800 may be performed at the terminal device 120 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

At block 810, the terminal device 120 may determine third information about a decoding time (N1) for a channel for receiving the downlink data, the decoding time being associated with a subcarrier spacing of the channel. In some embodiments, the terminal device 120 may receive the third information via an RRC signaling from the network device 110.

In some alternative embodiments, the terminal device 120 may determine the third information based on a mapping from a set of subcarrier spacings to a set of decoding time, the set of subcarrier spacings comprising at least one subcarrier spacing equal to or greater than a first predetermined value. In some embodiments, the first predetermined value may be selected from a group consist of 480 KHz, 960 KHz, 1920 KHz and 3840 KHz. For example, the terminal device 120 may determine the third information based on Tables 9 and 10 described above.

At block 820, the terminal device 120 may determine fourth information about a time unit, the time unit being associated with the subcarrier spacing. In some embodiments, the time unit may be predefined for at least one subcarrier spacing equal to or greater than a first predetermined value. In some embodiments, the first predetermined value may be selected from a group consist of 480 KHz, 960 KHz, 1920 KHz and 3840 KHz.

In some alternative embodiments, the terminal device 120 may determine a third scaling factor based on a sampling frequency and an associated mapping from a set of subcarrier spacings to a set of scaling factors, the set of subcarrier spacings comprising at least one subcarrier spacing equal to or greater than a first predetermined value. In some embodiments, the first predetermined value may be selected from a group consist of 480 KHz, 960 KHz, 1920 KHz and 3840 KHz. Upon determining the third scaling factor, the terminal device 120 may determine the fourth information based on the third scaling factor.

At block 830, the terminal device 120 may determine, based on the third and fourth information, whether the downlink data has enough processing time to be received. Its processing is similar with that described with reference to 425 in FIG. 4 and is not repeated here. At block 840, the terminal device 120 may transmit the acknowledgment in accordance with a determination that the downlink data has enough processing time to be received.

Figure 8:
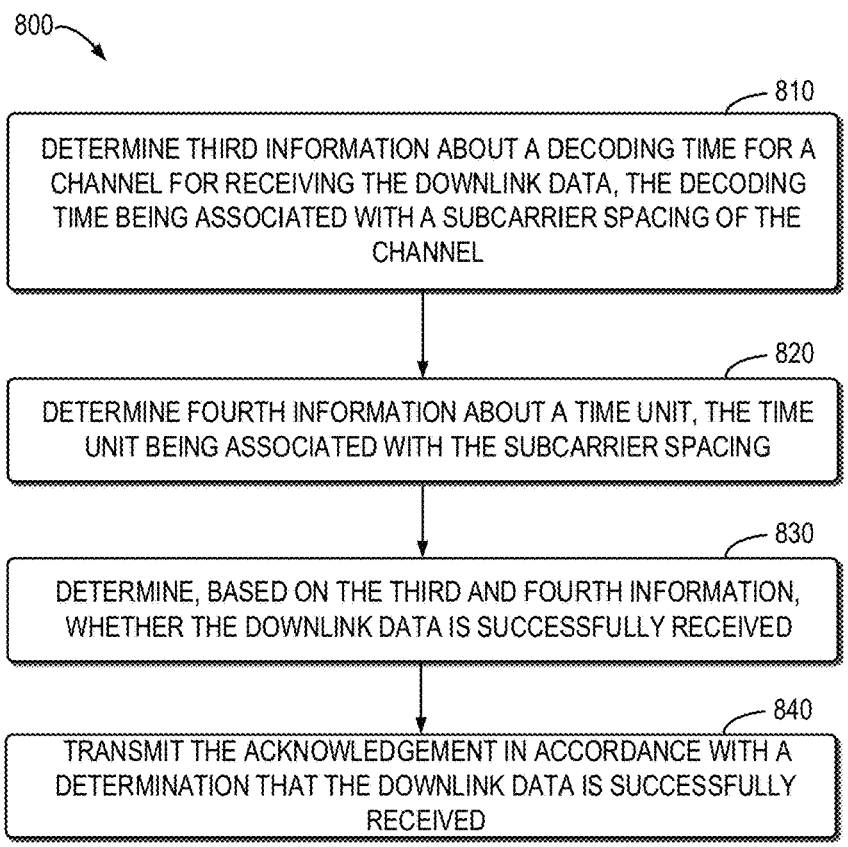
FIG. 8 illustrates another example method of communication implemented at a terminal device during downlink data reception in accordance with some embodiments of the present disclosure.

So far, downlink data reception at the terminal device 120 is described with reference to FIGS. 7 and 8. In this way, more downlink slots can be scheduled and channel utilization can be increased. Further, a proper timing for HARQ-ACK feedback and processing time at a terminal device can be flexibly configured.

Figure 9:
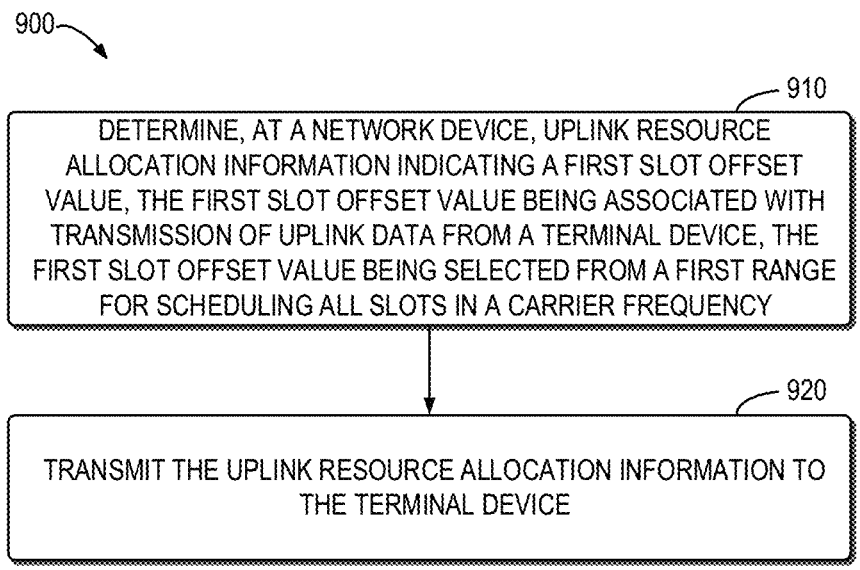
FIG. 9 illustrates an example method of communication implemented at a network device during uplink resource allocation in accordance with some embodiments of the present disclosure.

FIG. 9 illustrates an example method 900 of communication implemented at a network device during uplink resource allocation in accordance with some embodiments of the present disclosure. For example, the method 900 may be performed at the network device 110 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard.

At block 910, the network device 110 determine uplink resource allocation information indicating a first slot offset value (K2). The first slot offset value is associated with transmission of uplink data from the terminal device 120. The first slot offset value is selected from a first range from a first start value to a first end value, so as to schedule all slots in a carrier frequency such as in a CC. In some embodiments, the first range may be from the first start value being zero to the first end value being equal to or greater than 64.

In some alternative embodiments, the network device 110 may determine a second slot offset value and a first scaling factor as the uplink resource allocation information.

The second slot offset value may be selected from a second range from a second start value to a second end value, the second start value being larger than or equal to the first start value, the second end value being less than the first end value. In some embodiments, the second range may be from the second start value being zero to the second end value being equal to or greater than 32. The first scaling factor may be one selected from a group of predetermined scaling factors. In some embodiments, the group of predetermined scaling factors may consist of 1, 2, 3 and 4. Upon determining the second slot offset value and the first scaling factor, the network device 110 may determine the first slot offset value based on a product of the second slot offset value and the first scaling factor.

In some alternative embodiments, the network device 110 may determine, as the uplink resource allocation information, a first index indicating the first slot offset value in a first set of slot offset values. The first set of slot offset values may be transmitted via an RRC signaling from the network device 110 to the terminal device 120.

At block 920, the network device 110 may transmit the uplink resource allocation information to the terminal device 120. In some embodiments, the network device 110 may determine first information about a preparing time (N2) for an uplink data channel associated with the transmission of the uplink data, and transmit the first information via an RRC signaling to the terminal device 120.

So far, uplink resource allocation at the network device 110 is described with reference to FIG. 9. In this way, more uplink slots can be scheduled and channel utilization can be increased. Further, processing time at a terminal device can be flexibly configured.

Figure 10:
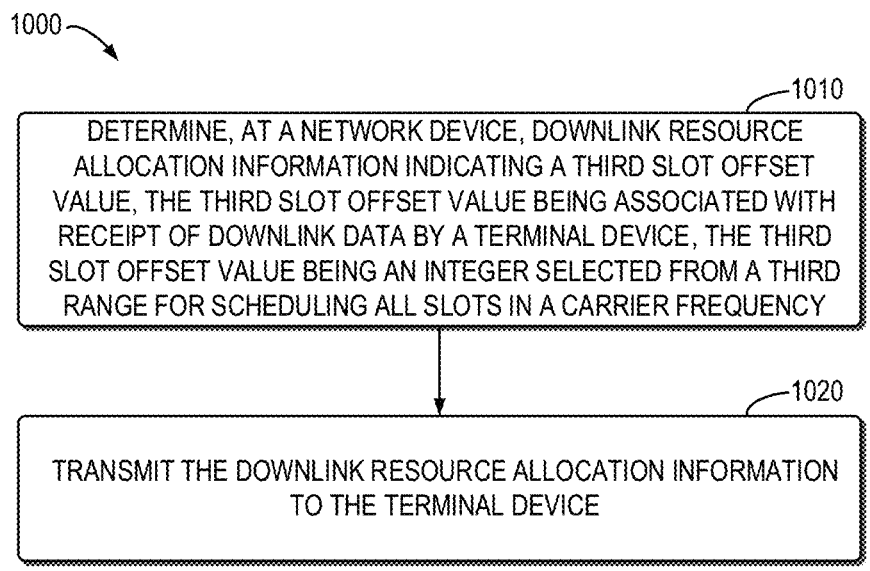
FIG. 10 illustrates an example method of communication implemented at a network device during downlink resource allocation in accordance with some embodiments of the present disclosure.

FIG. 10 illustrates an example method 1000 of communication implemented at a network device during downlink resource allocation in accordance with some embodiments of the present disclosure. For example, the method 1000 may be performed at the network device 110 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard.

At block 1010, the network device 110 determine downlink resource allocation information indicating a third slot offset value (K0). The third slot offset value is associated with reception of downlink data at the terminal device 120. The third slot offset value is selected from a third range from a third start value to a third end value, so as to schedule all slots in a carrier frequency such as in a CC. In some embodiments, the third range may be from the third start value being zero to the third end value being equal to or greater than 64.

In some alternative embodiments, the network device 110 may determine a fourth slot offset value and a third scaling factor as the uplink resource allocation information. The fourth slot offset value may be selected from a fourth range from a fourth start value to a fourth end value, the fourth start value being larger than or equal to the third start value, the fourth end value being less than the third end value. In some embodiments, the fourth range may be from the fourth start value being zero to the fourth end value being equal to or greater than 32. The third scaling factor may be one selected from a group of predetermined scaling factors. In some embodiments, the group of predetermined scaling factors may consist of 1, 2, 3 and 4. Upon determining the fourth slot offset value and the third scaling factor, the network device 110 may determine the third slot offset value based on a product of the fourth slot offset value and the third scaling factor.

In some alternative embodiments, the network device 110 may determine, as the downlink resource allocation information, a second index indicating the third slot offset value in a second set of slot offset values. The second set of slot offset values may be transmitted via an RRC signaling from the network device 110 to the terminal device 120.

At block 1020, the network device 110 may transmit the downlink resource allocation information to the terminal device 120. In some embodiments where the downlink resource allocation information further indicates a fifth slot offset value (K1) associated with transmission of an acknowledgment (HARQ-ACK) for the receipt of the downlink data, the network device 110 may receive the acknowledgment from the terminal device 120. The fifth slot offset value is selected from a fifth range from a fifth start value to a fifth end value, so as to schedule all slots in a carrier frequency such as in a CC. In some embodiments, the fifth range may be from the fifth start value being zero to the fifth end value being equal to or greater than 31.

In some embodiments, the network device 110 may determine third information about a decoding time (N1) for a channel for receiving the downlink data, and transmit the third information via an RRC signaling to the terminal device 120.

So far, downlink resource allocation at the network device 110 is described with reference to FIG. 10. In this way, more downlink slots can be scheduled and channel utilization can be increased. Further, a proper timing for HARQ-ACK feedback and processing time at a terminal device can be flexibly configured.

The implementations of the methods described in FIGS. 5-10 substantially correspond to the processes described in connection with FIG. 1-4, and thus other details are not repeated here. With the methods 500-1000 according to embodiments of the present disclosure, more uplink or downlink slots can be scheduled and channel utilization can be increased. Further, a proper timing for HARQ-ACK feedback and processing time at a terminal device can be flexibly configured. In addition, with the large SCS, large bandwidth in frequency above 52.6 GHz can be supported.

Figure 11:
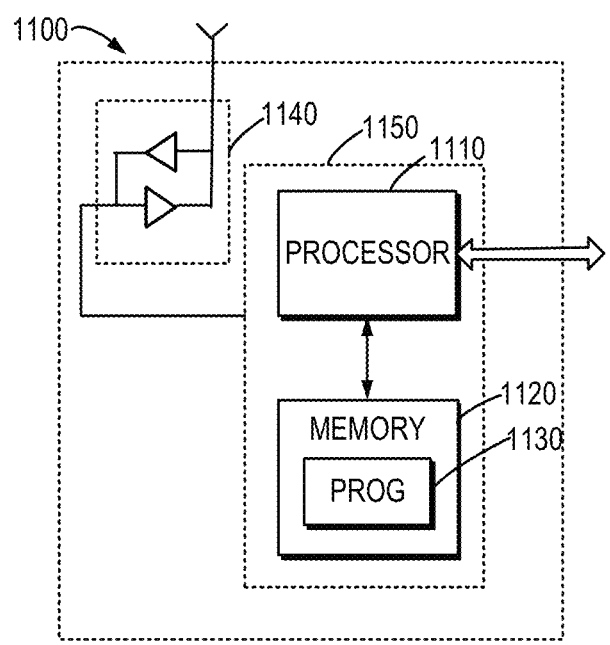
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 110 or the terminal device 120 as shown in FIG. 1. Accordingly, the device 1100 can be implemented at or as at least a part of the first network device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 1 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 1 to 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
   receiving, from a network device, a first sequence of one or more integers,
   wherein the one or more integers correspond to timing for a Physical Downlink Shared Channel (PDSCH) to a hybrid automatic repeat request (HARQ)-acknowledgement (ACK);
   receiving the PDSCH; and
   transmitting the HARQ-ACK in a Physical Uplink Control Channel (PUCCH), wherein:
      each value of the one or more integers is within a first range,
      the first range is dependent on a subcarrier spacing (SCS) value to be used,
      the first range comprises a first minimum value and a first maximum value, and
      the first maximum value is extended from 15 to 127 for SCS values being equal to or larger than 480 kHz.

2. The method of claim 1, wherein a PDSCH decoding time for PDSCH processing capability 1 is larger for SCS values of 480 kHz and 960 kHz than for SCS values smaller than 480 kHz.

3. The method of claim 2, wherein the terminal device transmits the HARQ-ACK upon determining that the PDSCH has enough processing time based on the PDSCH decoding time.

4. The method of claim 1, further comprising:
   receiving at the terminal device, a first parameter indicating a first offset value for transmission of a Physical Uplink Shared Channel (PUSCH), wherein:
      the first offset value is within a second range,
      the second range comprises a second minimum value and a second maximum value,
      the second minimum value is 0, and
      the second maximum value is 128.

5. The method of claim 1, further comprising:
   receiving at the terminal device, a second parameter indicating a second offset value for reception of the PDSCH, wherein:
      the second offset value is within a third range,
      the third range comprises a third minimum value and a third maximum value,
      the third minimum value is 0, and
      the third maximum value is 128.

6. A method of communication performed by a network device, the method comprising:
   transmitting, to a terminal device, a first sequence of one or more integers,
      wherein the one or more integers correspond to timing for a Physical Downlink Shared Channel (PDSCH) to a hybrid automatic repeat request (HARQ)-acknowledgement (ACK);
   transmitting the PDSCH; and
   receiving the HARQ-ACK in a Physical Uplink Control Channel (PUCCH), wherein:
      each value of the one or more integers is within a first range,
      the first range is dependent on a subcarrier spacing (SCS) value to be used,
      the first range comprises a first minimum value and a first maximum value, and
      the first maximum value is extended from 15 to 127 for SCS values being equal to or larger than 480 kHz.

7. The method of claim 6, wherein a PDSCH decoding time for PDSCH processing capability 1 is larger for SCS values of 480 kHz and 960 kHz than for SCS values smaller than 480 kHz.

8. The method of claim 7, wherein the HARQ-ACK is received upon determination that the PDSCH has enough processing time based on the PDSCH decoding time.

9. The method of claim 6, further comprising:
   transmitting at the network device, a first parameter indicating a first offset value for transmission of a Physical Uplink Shared Channel (PUSCH), wherein:
      the first offset value is within a second range,
      the second range comprises a second minimum value and a second maximum value,
      the second minimum value is 0, and
      the second maximum value is 128.

10. The method of claim 6, further comprising:
    transmitting at the network device, a second parameter indicating a second offset value for transmission of the PDSCH, wherein:

the second offset value is within a third range,
the third range comprises a third minimum value and a third maximum value,
the third minimum value is 0, and
the third maximum value is 128.

11. A terminal device, comprising:
at least one memory, having stored therein program instructions;
at least one processor that when executing the program instructions performs a method comprising:
receiving a first list from a network device, a first sequence of one or more integers,
wherein the one or more integers correspond to timing for a Physical Downlink Shared Channel (PDSCH) to a hybrid automatic repeat request (HARQ)-acknowledgement (ACK);
receiving the PDSCH; and
transmitting the HARQ-ACK in a Physical Uplink Control Channel (PUCCH), wherein:
each value of the one or more integers is within a first range,
the first range is dependent on a subcarrier spacing (SCS) value to be used,
the first range comprises a first minimum value and a first maximum value, and
the first maximum value is extended from 15 to 127 for SCS values being equal to or larger than 480 kHz.

12. The terminal device of claim 11, wherein a PDSCH decoding time for PDSCH processing capability 1 is larger for SCS values of 480 kHz and 960 kHz than for SCS values smaller than 480 kHz.

13. The terminal device of claim 12, wherein the HARQ-ACK is transmitted upon determining that the PDSCH has enough processing time based on the PDSCH decoding time.

14. The terminal device of claim 11, wherein the processor is further configured to:
receive a first parameter indicating a first offset value for transmission of a Physical Uplink Shared Channel (PUSCH), wherein:
the first offset value is within a second range,
the second range comprises a second minimum value and a second maximum value,
the second minimum value is 0, and
the second maximum value is 128.

* * * * *